(12) United States Patent
Ziv et al.

(10) Patent No.: US 12,547,144 B1
(45) Date of Patent: Feb. 10, 2026

(54) SYSTEM AND METHOD FOR MAINTAINING BUILD QUALITY IN ADDITIVE MANUFACTURING BY COMPENSATION OF ENVIRONMENTAL EFFECTS

(71) Applicant: United States of America as Represented by the Secretary of the Navy, Arlington, VA (US)

(72) Inventors: Scott Ziv, Gaithersburg, MD (US); Michael Ziv, Spotsylvania, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 312 days.

(21) Appl. No.: 18/355,530

(22) Filed: Jul. 20, 2023

Related U.S. Application Data

(60) Provisional application No. 63/394,375, filed on Aug. 2, 2022.

(51) Int. Cl.
| | |
|---|---|
| *G05B 19/404* | (2006.01) |
| *B22F 10/85* | (2021.01) |
| *B29C 64/386* | (2017.01) |
| *B29C 64/393* | (2017.01) |
| *B33Y 50/00* | (2015.01) |
| *B33Y 50/02* | (2015.01) |

(52) U.S. Cl.
CPC ............ *G05B 19/404* (2013.01); *B22F 10/85* (2021.01); *B29C 64/386* (2017.08); *B29C 64/393* (2017.08); *B33Y 50/00* (2014.12); *B33Y 50/02* (2014.12); *G05B 2219/49206* (2013.01)

(58) Field of Classification Search
CPC ........ G05B 19/404; G05B 2219/49206; B22F 10/85; B29C 64/386; B29C 64/393; B33Y 50/00; B33Y 50/02
USPC ......................................................... 700/119
See application file for complete search history.

(56) References Cited

U.S. PATENT DOCUMENTS

| | | |
|---|---|---|
| 9,724,876 B2 | 8/2017 | Cheverton |
| 10,421,267 B2 | 9/2019 | Reese |
| 10,538,074 B2 | 1/2020 | Cortes |
| 10,866,003 B2 | 12/2020 | Ajax |
| 11,097,490 B2 | 8/2021 | Putman |
| 11,311,959 B2 | 4/2022 | Hardwick |
| 11,852,505 B2 | 12/2023 | Brown |
| 2017/0252820 A1 | 9/2017 | Myerberg |
| 2018/0099333 A1 | 4/2018 | DehghanNiri |
| 2019/0061267 A1* | 2/2019 | Valero Navazo ......... G01J 5/00 |

(Continued)

*Primary Examiner* — Michael J Brown
(74) *Attorney, Agent, or Firm* — Jesus J. Hernandez; U.S. Department of the Navy, Office of the General Counsel

(57) ABSTRACT

Example embodiments provide an additive manufacturing (AM) compensation system comprising a sensor suite, a controller unit, and an AM device. The sensor suite may be configured to measure ambient conditions through the use of at least one sensing element. The controller unit may be configured to receive the measured ambient conditions and generate adjusted AM data corresponding to a build in response to the measured ambient conditions, the controller comprising a ruleset comparison unit, a machine instruction buffer, and machine instructions for the build. The AM device may be configured to receive the adjusted AM data and manufacturing the build based on the adjusted AM data.

19 Claims, 10 Drawing Sheets

(56) References Cited

U.S. PATENT DOCUMENTS

2020/0009851 A1\* 1/2020 Susnjara ................ B33Y 80/00
2022/0339875 A1 10/2022 Czinger \* cited by examiner

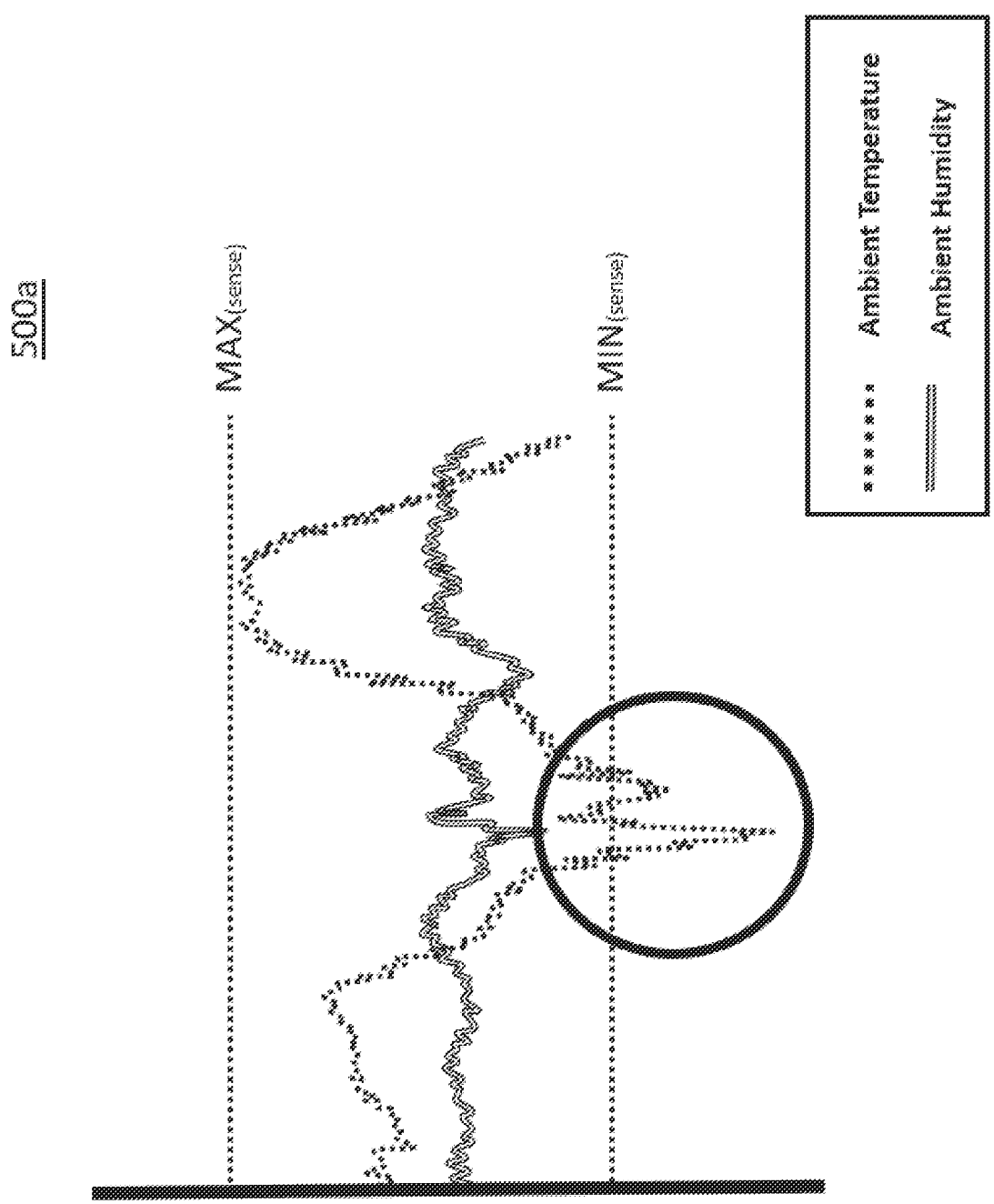

SYSTEM AND METHOD FOR MAINTAINING BUILD QUALITY IN ADDITIVE MANUFACTURING BY COMPENSATION OF ENVIRONMENTAL EFFECTS

CROSS-REFERENCE TO RELATED APPLICATIONS

This application claims the benefit of U.S. Provisional Application No. 63/394,375 filed Aug. 2, 2022, titled "Method for Maintaining Build Quality in Additive Manufacturing By Compensation Of Environmental Effects," incorporated herein by reference.

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

FIELD

The following description relates generally to additive manufacturing.

BACKGROUND

Additive Manufacturing (AM) systems build 3D objects by drawing multiple 2D layers, one at a time. As such, AM systems are inherently kinematic systems. This is particularly true for material extrusion systems. Kinematic systems require precise movement of often weighty tool heads.

AM systems, like most commercial production equipment, are certified by their manufacturers to produce consistent results within a specific window of ambient conditions. This generally includes fixed and non-extreme conditions pertaining to motion, temperature, and atmospheric humidity. In almost all applications, AM systems run indoors. AM systems operate in air conditioned, stable, and dry environments.

Manufacturer specifications define allowable operating conditions. Manufacturer specifications define "go" or "no-go" conditions for the use of AM systems in a given environment. Operation outside the manufacturer's defined conditions nullifies machine certification by the manufacturer. Parts produced by these systems are generally considered unfit for use because of the nullification of the machine certification. As a result, AM systems that operate outside of allowable operating condition are of limited value.

SUMMARY

Example embodiments provide an additive manufacturing (AM) compensation system comprising a sensor suite, a controller unit, and an AM device. The sensor suite may be configured to measure ambient conditions through the use of at least one sensing element. The controller unit may be configured to receive the measured ambient conditions and generate adjusted AM data corresponding to a build in response to the measured ambient conditions, the controller comprising a ruleset comparison unit, a machine instruction buffer, and machine instructions for the build. The AM device may be configured to receive the adjusted AM data and manufacturing the build based on the adjusted AM data.

BRIEF DESCRIPTION OF DRAWINGS

The accompanying figures are included to provide a further understanding of example embodiments, and are incorporated in and constitute part of this specification. In the figures:

FIG. 5A is measured data from a sensor suite in a build quality compensation system, according to an example embodiment.

DETAILED DESCRIPTION

In the following description, for purposes of explanation and not limitation, specific details are set forth such as particular structures, designs, techniques, etc., in order to provide a thorough understanding of the example embodiments. However, it will be apparent to those skilled in the art that the disclosed subject matter may be practiced in other illustrative embodiments that depart from these specific details. In some instances, detailed descriptions of well-known elements and/or method are omitted so as not to obscure the description with unnecessary detail. All principles, aspects, and embodiments, as well as specific examples thereof, are intended to encompass both structural and functional equivalents of the disclosed subject matter. Additionally, it is intended that such equivalents include both currently known equivalents as well as equivalents developed in the future.

The following description refers to a system and method for maintaining build quality in AM by compensation of environmental effects. However, it should be noted that the example embodiments shown and described herein are meant to be illustrative only and not limiting in any way. As such, various modifications will be apparent to those skilled in the art for application to AM based on technologies other than the above, which may be in various stages of development and intended for future replacement of, or use with, the above described method or apparatus.

There has been a lot of work in recent years quantifying the failure point of AM systems. This includes shock tolerance, temperature tolerance, and movement/acceleration tolerance. Most of these efforts are simply data collection to gauge a go/no-go decision. Little work has been put into correcting AM systems in view of these measured tolerances. The goal of example embodiments is to provide live compensation into AM systems when operating in non-ideal conditions and/or beyond the parameters contemplated by a manufacturer. This is realized by sensing the ambient environment and adjusting AM parameters in real-time to compensate for sensed ambient conditions. Such operation allows an AM system to maintain consistent part-quality in a wider range of operating conditions.

Figure 1:
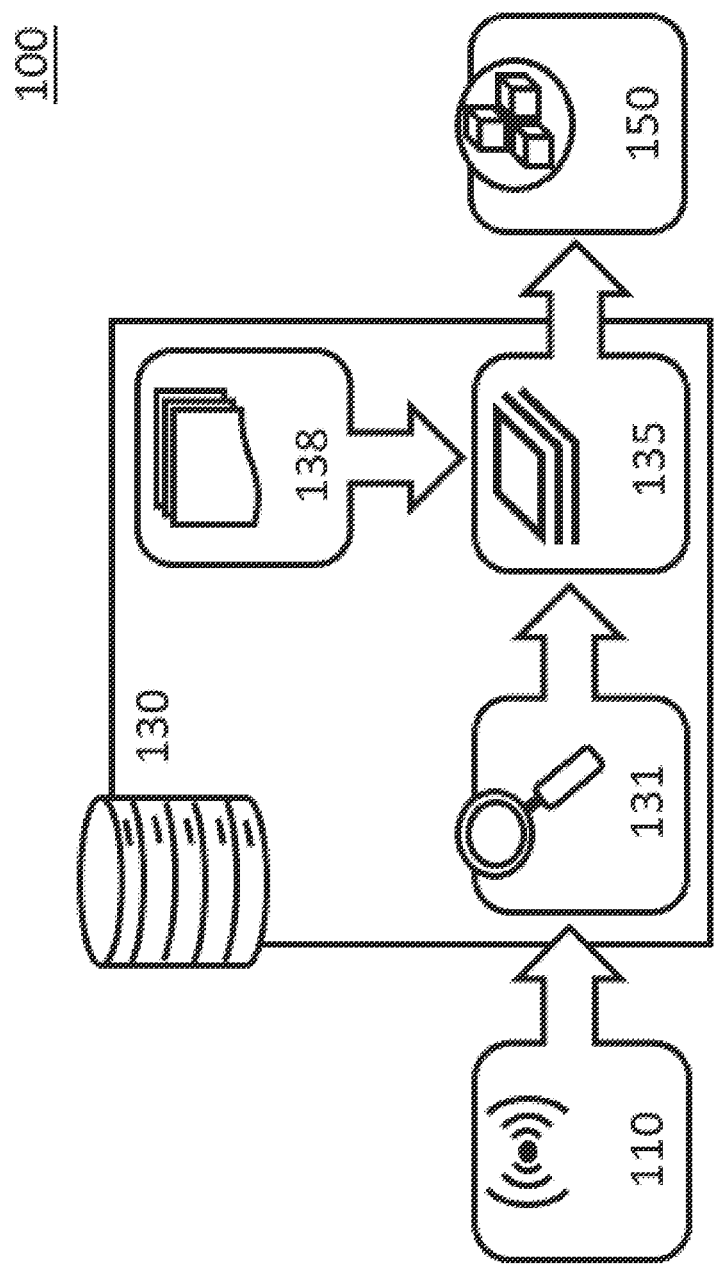
FIG. 1 is a build quality compensation system, according to an example embodiment.

FIG. 1 is a build quality compensation system 100, according to an example embodiment. Build quality compensation system 100 uses a machine and material-specific ruleset to widen the window of operational use of an AM system. The build quality compensation system 100 includes a sensor suite 110, a controller unit 130, and an AM device 150.

The sensor suite 110 may be a collection of sensors that are configured to sense ambient conditions in a mobile unit. This may include, but are not limited to, ambient temperature, humidity, and/or movement. Movement may include, but are not limited to, velocity and/or acceleration. At a more particular level, the sensors may also measure vibration and shocks. The measured ambient conditions may be those within a defined space inside a mobile unit in which the build quality compensation system 100 resides. The mobile unit may be a vessel. In alternative embodiments, the mobile unit may be an aircraft, vehicle, submersible, and/or a spacecraft.

In the case of the mobile unit being a vessel, the sensor suite 110 may measure the level of humidity within a compartment in the hull of a vessel while it is traversing a storm. In such a scenario, the measured humidity is internal to the hull, as opposed to the storm conditions outside of the hull. Nevertheless, in alternative example embodiments, the sensed ambient conditions may actually be those external to the mobile unit—in this case the storm. In yet another alternative embodiment, the sensed ambient conditions may be a combination of the conditions within and outside of a mobile unit.

The controller unit 130 oversees the build compensation process based on the sensed environmental parameters.

The controller unit 130 runs software capable of sending live GCode commands to the AM device 150 and at the same time, receive another live thread of information from the sensor suite 110. The controller unit 130 may include a ruleset comparison unit 131, a machine instruction buffer 135, and machine instructions 138.

The ruleset comparison unit 131 includes a locally stored ruleset. In alternative example embodiments, the rulesets may be external. The ruleset comparison unit 131 is able to compare the measurements from the sensor suite 110 with the locally stored rulesets. The ruleset comparison unit 131 may then determine an adjustment instruction based on the comparison with the ruleset. The adjustment instruction may then be injected into the machine instruction buffer 135. Each adjustment instruction may correspond with a specific operation of the AM device 150. For example, if the sensor suite 110 measures an ambient temperature that is below a defined threshold in the ruleset, a particular adjustment instruction may be extrapolated and injected to the machine instruction buffer 135.

The controller unit 130 may include machine instructions 138. These machine instructions 138 are pre-defined standard instructions for a particular build. The machine instructions 138 are for operation of the AM device 150 under ideal and/or manufacturer specified conditions. The machine instructions 138 may encompass standard geometric data, machine data, material data, and/or metadata corresponding to a particular selected build. Said standard data may be segmented after having undergone a slicing operation to facilitate a layered build. The machine instructions 138 may be constantly fed to the machine instruction buffer 135 as would be the case for a conventional AM device.

The machine instruction buffer 135 receives the machine instructions 138. The machine instruction buffer 135 also receives in real time adjustment instructions from the ruleset comparison unit 131. As part of a data buffering operation, the machine instruction buffer 135 adjusts the received machine instructions to incorporate the ruleset adjustment instructions. The adjustments may deviate from the pre-defined instructions of the AM device 150 manufacturer in order to take into account the measured thresholds deviating from the ideal operating parameters. The adjustment may be "injected" into the standard data, resulting in "adjusted" data. In other words, the result is "adjusted" geometric data, machine data, material data, and/or metadata corresponding to a particular selected build.

The final component of the build quality compensation system 100 is the AM device 150. The AM device 150 may be a 3D printer. In alternative example embodiments, the AM device 150 may be a VAT photopolymerisation device, material jetting, a material extrusion, a powder bed fusion, a sheet lamination device, and/or a directed energy deposition system. The AM device 150 receives the output from the machine instruction buffer 135. The received ruleset adjustment instructions compensate for the limitations of the predefined machine instructions 138. As such, the ruleset adjustment instructions from the machine instruction buffer 135 allows the AM device 150 to operate in more demanding and unknown environments via a mobile unit in a variety of settings—land, sea, air, and space. For example, build quality compensation system 100 permits AM device 150 to operate in a moving vessel in open sea, in a search and rescue vehicle in a scorching desert, or in an expeditionary vehicle in the freezing tundra. Use cases may further include commercial shipping, rapid medical response, or scientific exploration environments.

Conventional AM devices utilize closed loop control systems to maintain part quality. This includes encoders on the motors or current sensors that sense head skips. Closed loop control systems are limited, however, by a rigid adherence to preplanned machine instructions. Closed loop systems are ideal for maintaining perfect machine motion quality in narrowly defined conditions. However, conditions beyond an AM device's scope require divergence from preplanned instructions in order to maintain part quality. For example, such deviations may include machine tilt that changes the relative direction of gravity. Build quality compensation system 100 permits AM device 150 to account for such deviations.

Figure 2:
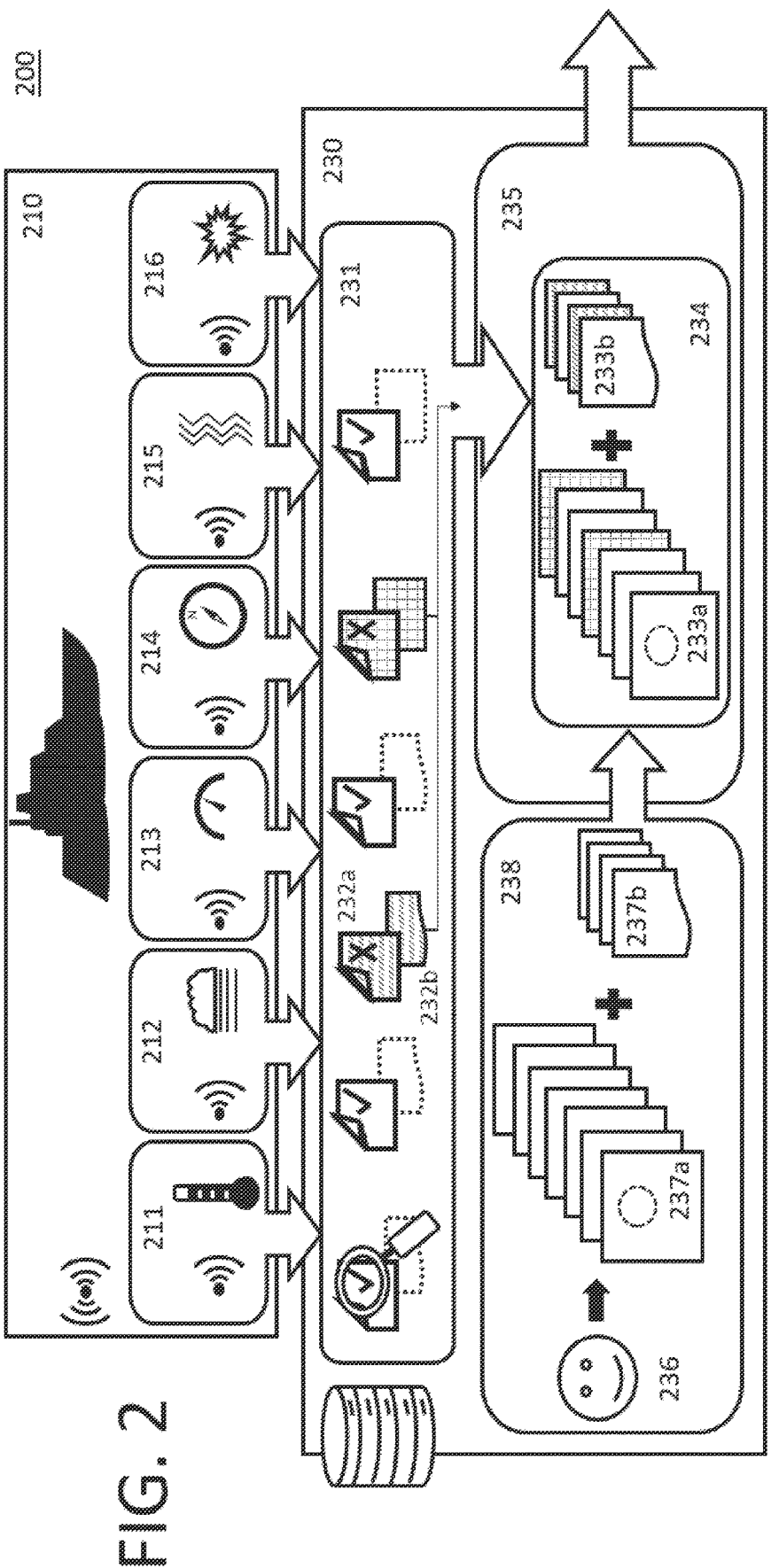
FIG. 2 is an operational diagram of a sensor suite and controller unit of a build quality compensation system, according to an example embodiment.

FIG. 2 is an operational diagram 200 of a sensor suite 210 and controller unit 230 of a build quality compensation system, according to an example embodiment. Operational diagram 200 highlights in particular detail the benefit of the build quality compensation system in a mobile unit. In such a setting, environmental changes may occur at unpredictable times during operation of an AM device which may adversely affect a build. In many instances, a slight real-time adjustment may be sufficient to counter unpredictable environmental conditions. In other instances, a hard-stop may be required. The sensor suite 210 is the first step in measuring such environmental changes.

The sensor suite 210 may be housed within a mobile unit. As depicted, the mobile unit may be a vessel that may cause its own forces (e.g., motor, movement) and/or itself be subject to external forces (e.g., ocean conditions, turbulence). As such, the sensor suite 210 may include an ambient temperature sensor 211, ambient humidity sensor 212, acceleration sensor 213, orientation sensor 214, ambient vibration sensor 215, and ambient shock sensor 216. The entire sensor suite 210 may be distributed throughout a predefined area of the mobile unit, housed in the AM device, and/or a combination thereof.

The sensor suite 210 may include additional sensors than those illustrated in FIG. 2. In addition, the respective sensors of the sensor suite 210 may perform respective measures at different intervals. For example, the ambient temperature sensor 211 may perform its measurements at longer time intervals than the ambient vibration sensor 215. Also, the sensor suite 210 may obtain metrics from external sensors. For example, ambient temperature and ambient humidity may be obtained from a thermostat system controlling temperature in a defined environment in a vessel. Finally, the respective sensors of the sensor suite 210 may be sensitive to magnitude, such that they may be dormant or semi-dormant until a threshold value triggers full operation.

Once ambient data has been measured by the sensor suite 210, the measured ambient data is then provided to a controller unit 230. More specifically, the measured ambient data is provided to a ruleset comparison unit 231 within the controller unit 230. The ruleset comparison unit 231 has stored rulesets 232a corresponding with tolerated threshold parameters for an AM device. The threshold parameters of a ruleset 232a may be in the form of a ceiling (maximum) and/or a floor (minimum). The threshold parameters may include, for example, the maximum and minimum tolerable ambient temperature, humidity, and/or vibration. In alternative example embodiments, the threshold parameters may be in the form of segmented operational functions. The ruleset may include, for example, a first operation at a first orientation and/or speed, a second operation at a second orientation and/or speed, and a third operation at a third orientation and/or speed.

Each ruleset 232a has a counterpart ruleset adjustment instruction 232b. If any of the threshold parameters of a ruleset 232a is triggered, the ruleset comparison unit 231 selects the counterpart ruleset adjustment instruction 232b for delivery and injection into a machine instruction buffer 235. The ruleset adjustment instruction 232b may correspond to either geometric data or other data (machine data, material data, metadata).

The controller unit 230 includes machine instructions 238. The machine instructions 238 may be in the form of standardized AM system instructions, such as GCode, ISO/ASTM 52915:2020, proprietary machine instructions, etc. For example, in the state of the art, GCode standard provides commands, line by line, according to a slicer. The commands define a geometry that a tool head must move about in order to generate a build. However, in the conventional art, such instructions must take place in stable, level, and manufacturer approved environments. Machine instructions 238 precisely reflects this set of manufacturer commands under ideal conditions.

Machine instructions 238 may correspond to a selected build 236. Selected build 236 may be one of a multitude of build designs. The build designs may be stored in a memory unit or provided from an external source, such as a computer, memory stick, a closed network, and/or the cloud. From the listing of possible builds, a selected build 236 may be extrapolated. The commands corresponding to a selected build 236 may be divided into two categories: geometric data for the selected build 237a and other data for the selected build 237b. The other data may encompass machine data, material data, and metadata.

A machine instruction buffer 235 provides commands to an AM device. Both the geometric data for the selected build 237a and other data for the selected build 237b are provided to the machine instruction buffer 235. More specifically, such data is provided to a tool pathing unit 234. The tool pathing unit 234 incorporates the ruleset adjustment instructions 232b from the ruleset comparison unit 231 and injects them to the manufacturer's machine instructions 238. As a result, the tool pathing unit 234 generates adjusted geometric data 233a and adjusted other data 233b by modifying the machine instructions 238. The machine instruction buffer 235 then provides the adjusted geometric data 233a and adjusted other data 233b to an AM device.

In this fashion, the manufacturer defined machine instructions 238 may be modified to account for ambient conditions. This is realized by the build quality compensation system through the interactions of the ruleset comparison unit 231, the machine instructions 238, and the machine instruction buffer 235.

For example, the ambient temperature sensor 211 may measure temperatures in a defined space within the vessel and/or in the exterior of the vessel. Low temperatures may cause weak layer bonding during the AM process. The strength of a build is determined by how well a top layer bonds to a layer below it. Even if an AM device is capable of maintaining a stable nozzle temperature, a cold environment will dramatically reduce strength. Therefore, nozzle temperature must be increased even further to compensate. Ambient temperature sensor 211 can detect such a deviation from an ideal operating temperature. In response, the controller unit 230 can increase nozzle temperature to compensate and ensure robust layer bonding under non-ideal temperature conditions.

The ambient humidity sensor 212 may measure atmospheric humidity in a defined space within the vessel and/or in the exterior of the vessel. Moisture can affect the structural soundness of a build, the efficiency of a nozzle, and even the quality of the supply/stool. For instance, the build may retain moisture within the structure after a supply has been inserted into place by the nozzle, impacting the soundness of material when being used for its intended purposes. Also, the moisture may impact layer bondness by delaying the drying process in the middle of a build. The ambient humidity sensor 212 can detect a deviation from ideal operating humidity. In response, the controller unit 230 of the build quality compensation system can increase nozzle temperature to compensate and ensure robust layer bonding. In alternative embodiments, the ambient humidity sensor 212 can adjust humidity settings within the AM device or in a defined space within the vessel.

The ambient acceleration sensor 213 may measure acceleration of a vessel. This acceleration may impact a z-axis motor and a x-axis motor of an AM device. In certain mobile units (e.g., submersibles, aircraft, and spacecraft), acceleration may impact a y-axis motor of an AM device. The ambient acceleration sensor 213 can detect if acceleration is impacting a motor in the AM device. In response, the build quality compensation system may adjust the speed of the motors in a particular axis most impacted by vessel acceleration. In alternative embodiments, the build quality compensation system may adjust the gear mechanisms of the motors to be slower and more finely controlled while subject to acceleration forces.

The orientation sensor 214 may measure tilt of a defined space within the vessel and/or in the exterior of the vessel. The tilt may include yaw, pitch, and roll. Tilt of an AM device may cause deformation of a build (drooping) due to the change in relative direction of gravity. The orientation sensor 214 can detect if tilt is impacting the AM device. In response, the build quality compensation system may make slight position changes to compensate for a tilt. In alternative embodiments, the build quality compensation system can pause the build until the tilting condition no longer exists or no longer exceeds a threshold parameter.

The ambient vibration sensor 215 may measure high frequency acceleration, in other words vibration, within the vessel and/or in the exterior of the vessel. Vibration reduces layer bonding in a build. The ambient vibration sensor 215 can detect vibration impacting the AM device and impairing performance. In response, the build quality compensation system may increase nozzle temperature to compensate for the impact on layer bonding. In some example embodiments, the build quality compensation system may alter (increase/decrease) the rigidity of a build platform dampener and/or an injection dampener. In some example embodiments, the build platform dampener and/or an injection dampener may be altered to generate a cancelling contra-positive vibration.

The ambient shock sensor 216 may measure shock or other forms of sudden low frequency accelerations (e.g., wave motion). Sudden shocks or impacts can alter the build of an AM device. Nevertheless, motors in an AM device have a torque-speed curve. While lowering motor speed increases build time, such action also allows a motor to hold a higher torque to compensate for shocks. The ambient shock sensor 216 can detect shocks impacting the AM device and impairing performance. In response, the build quality compensation system may reduce motor speed when the shocks or other forms of sudden low frequency accelerations manifest (e.g., tougher seas). It can also increase motor speed in more ideal conditions (e.g., calm waters). In alternative embodiments, other forms of shock (e.g., rapid shock) may be compensated for pausing or terminating the build, or by applying a physical or electronic motor brake.

The adjustments described above, while machine and material specific, are nonetheless part agnostic. Irrespective of the selected build, the corrections can be injected in real time during a build to compensate for ambient conditions beyond the comprehension of an AM device. In example embodiments, if a measurement from the sensor suite is so extreme as to be incapable of adjustment or compensation by an AM device, then the build quality compensation system can cancel the build and alert a user.

An advantage of the build quality compensation system is that the exact ambient operating conditions of an AM system do not need to be known ahead of time. Instead, conditions need to be tested enough to develop a ruleset, at which point the build quality compensation system can compensate on its own. This is an improvement on closed loop AM systems and conventional open loop AM systems. For example, closed loop AM systems that are calibrated for a low motion environment will fail if suddenly introduced to a higher motion one. In contrast, the build quality compensation system contemplated by example embodiments permit real-time and "on the fly" adjustments of the AM system.

In the build quality compensation system, the ruleset adjustment instructions 232b are: (i) AM device and material specific and (ii) part agnostic. As such, the injection of the ruleset adjustment instructions 232b can take place across different machine instructions 238 (and corresponding sliced files) of various types of AM devices. Under the conventional art, this is achievable with a preprocessor. Example embodiments achieve this without the use of a preprocessor, making the build process faster and increasing interoperability.

Figure 3:
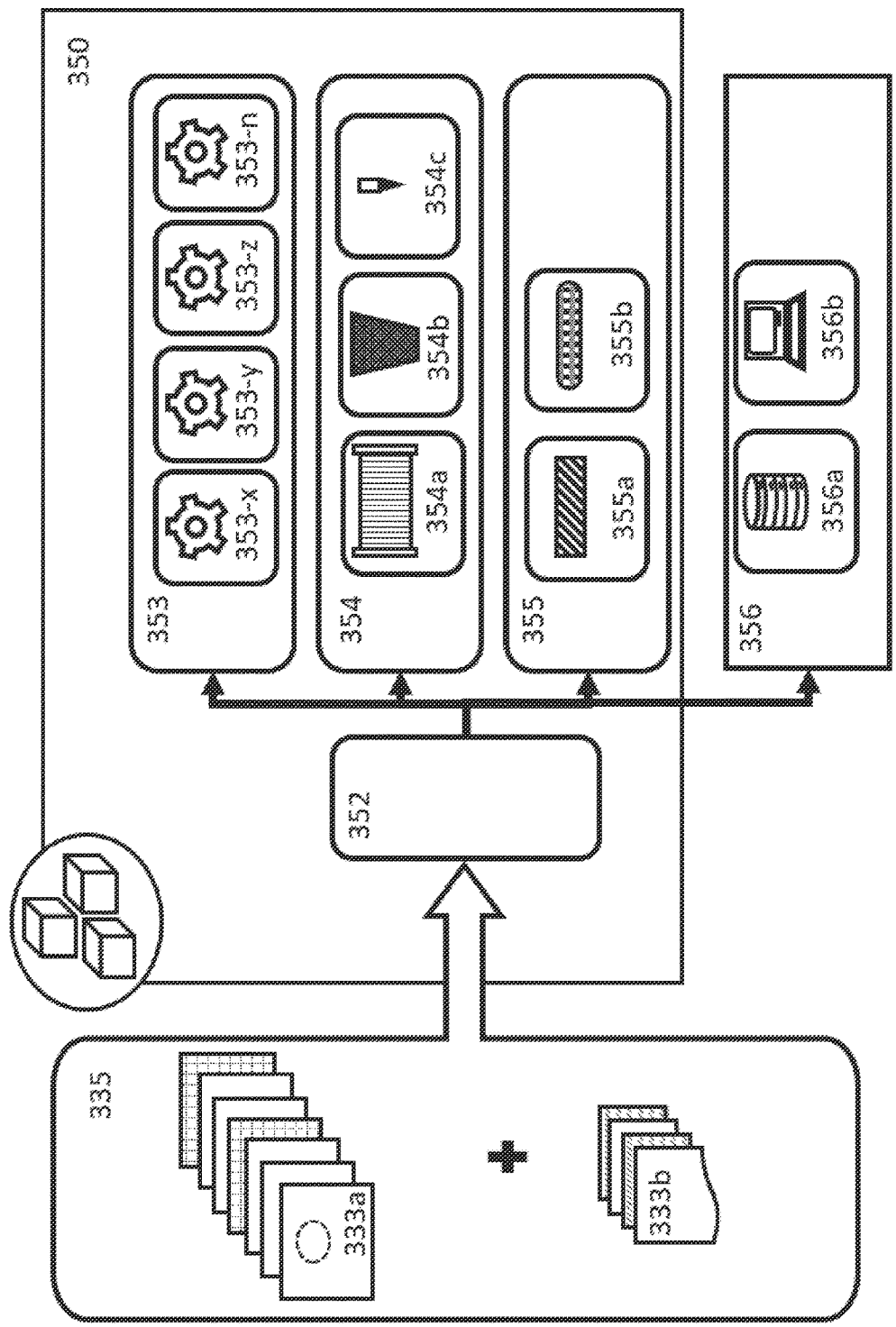
FIG. 3 is an operational diagram of a machine instruction buffer and an AM device of a build quality compensation system, according to an example embodiment.

FIG. 3 is an operational diagram 300 of a machine instruction buffer 335 and an AM device 350 of a build quality compensation system, according to an example embodiment. The operational diagram 300 includes a machine instruction buffer 335 from a controller unit (as discussed in the previous figure) providing data to an AM device 350. More specifically, an AM device controller 352 receives the adjusted geometric data 333a and adjusted other data 333b for a selected build. As previously stated, said data may be in GCode format. The AM device controller 352 then provides specific instructions to various components of the AM device 350. The pertinent components may be divided into four categories: motors 353; injection system 354; vibration dampener system 355; and external systems 356.

The motors 353 may comprise an x-axis motor 353-$x$, a y-axis motor 353-$y$, and a z-axis motor 353-$z$. The motors control the orientation of an injection system 354. During an AM process, each motor moves the injection system 354 pursuant to the adjusted geometric data 333a and adjusted other data 333b for a selected build. The adjusted geometric data 333a may dictate the location of each motor according to its respective axis. The adjusted other data 333b may encompass machine data, material data, metadata. As such, the adjusted other data 333b may control the speed of each motor, torque of respective motors, and/or other structural parameters. The motors 353 may also include an other motor 353-$n$ that is separate from the axis-controlling motors. In some example embodiments, the other motor 353-$n$ may adjust and/or stabilize the position of the entire AM device 350 within a predefined space in a mobile unit.

The injection system 354 may include a supply/spool 354a, heating element 354b, and nozzle 354c. The supply/spool 354a may be a plastic or metal spooled wire. The plastic may be polylactic acid (PLA), acrylonitrile butadiene styrene (ABS), or any similar polymer. The metal may be stainless steel, aluminum, titanium, cobalt chrome, inconel, nickel, an alloy thereof, or other similar metal. In alternative embodiments, the supply/spool 354a may be a powder supply. The heating element 354b may be a substance that generates heat and/or thermal energy in order to transform the material from the supply/spool 354a into a malleable product that can be positioned in a proper location. The nozzle 354c delivers the transformed material from the supply/spool 354a to its location. The entire injection system 354 may be positioned into place by the motors 353 based on the adjusted geometric data 333a. The adjusted other data 333b may provide information for controlling various operational functions of the injection system 354. For instance, the adjusted other data 333b may dictate the rate that the supply/spool 354a provides material to the heating element 354b. The adjusted other data 333b may dictate the temperature of the heating element 354b. Also, the adjusted other data 333b may dictate the speed in which the nozzle 354c delivers the transformed material. All these functions may be altered in response to environmental factors, as dictated by the adjusted other data 333b. In some example embodiments, these functions may also be altered in response to adjusted geometric data 333a as well.

The vibration dampener system 355 may include a build platform dampener 355a and an injection dampener 355b. The build platform dampener 355a is positioned alongside the platform and is designed to offset ambient vibrations during a build from the receiving side. The injection dampener 355b is configured alongside the injection system 354 and is designed to prevent vibration during a build from the supplying side. The adjusted other data 333b may provide information for controlling operation of the build platform dampener 355a and an injection dampener 355b when a threshold level of vibration is detected by a sensor suite. In one example embodiment, the adjusted other data 333b causes the build platform dampener 355a and/or the injection dampener 355b to alter (increase/decrease) its rigidity. In another example embodiment, the adjusted other data 333b causes the build platform dampener 355a and/or the injection dampener 355b to generate a cancelling contrapositive vibration.

Finally, the external systems 356 may include a mobile unit system 356a and an additional computing system 356b. The adjusted geometric data 333a and the adjusted other data 333b may be provided to external systems 356 to provide a real time feed of the build quality compensation unit. The mobile unit system 356a may be the mainframe controlling operation of the mobile unit, which may be a vessel. This may allow operation, monitoring, and/or troubleshooting of the AM device 350 from a different location in a vessel. The mobile unit system 356a may be a user-defined or user-activated system. In alternative embodiments, the mobile unit system 356a may be an automated or AI system. The additional computing system 356b may be a separate system also residing in the mobile unit. In alternative embodiments, the additional computing system 356b may be an external system, such as a network, cloud, or another monitoring mobile unit.

Figure 4:
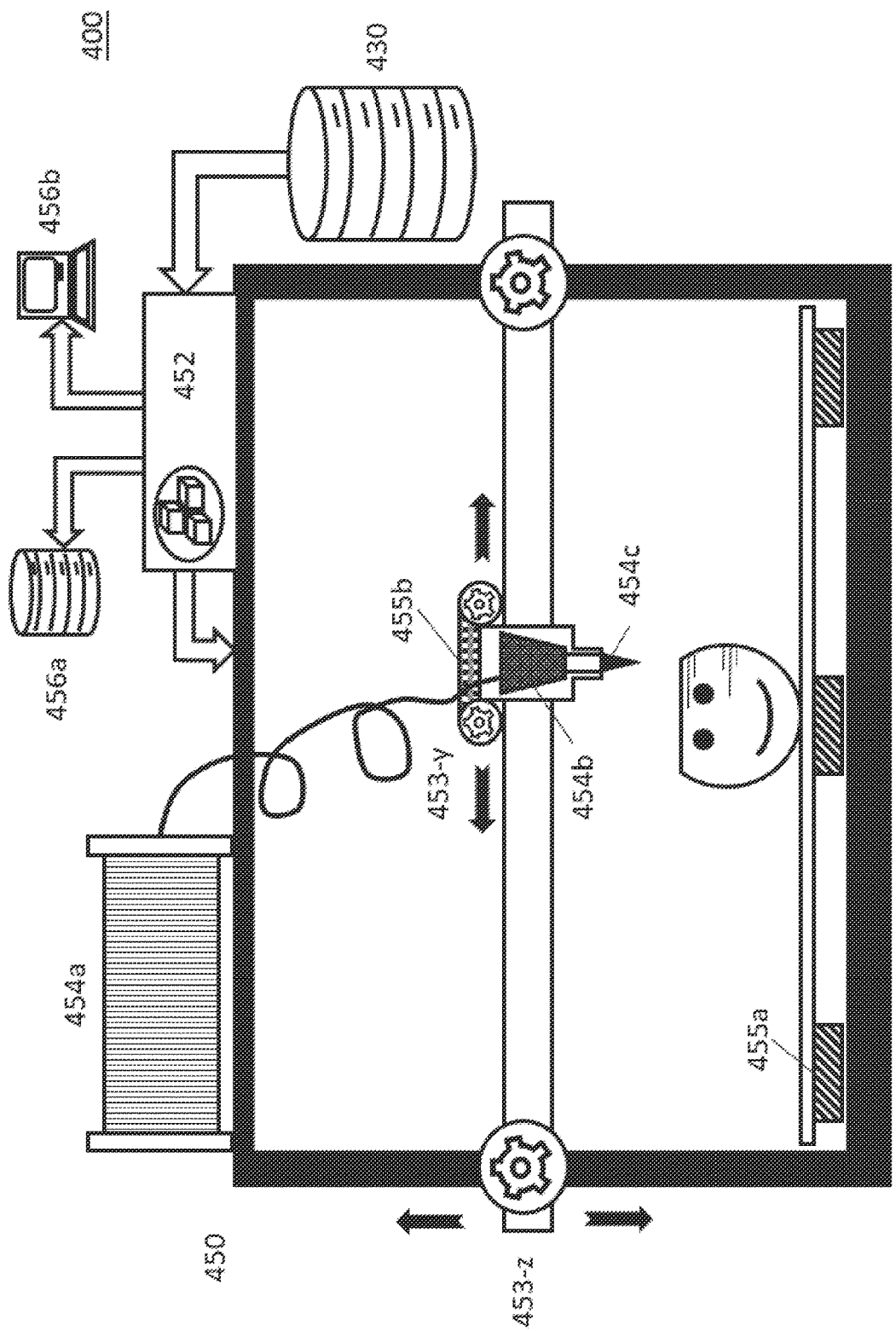
FIG. 4 is an AM device of a build quality compensation system according to an example embodiment.

FIG. 4 is an AM device of a build quality compensation system 400 according to an example embodiment. As depicted, the controller unit 430 provides adjusted geometric data and adjusted other data for a selected build to the AM device controller 452. The AM device controller 452 is then able to send operational instructions to the various components of the AM device 450 pursuant to the adjusted geometric data and adjusted other data. With respect to the motors, this includes instructions to the z-axis motor 453-z and the y-axis motor 453-y. The AM device 450 is illustrated in two dimensional form, but it is understood that it would include an x-axis motor as well. Notably, in AM convention, movement along vertical axis is denoted as the "z-axis."

The AM device controller 452 may also control the injection system. More specifically, the AM device controller 452 may control the temperature of the heating element 454b and the speed in which the nozzle 454c delivers the transformed material. The AM device controller 452 may also control the rate that the supply/spool 354a provides material to the heating element 354b.

The AM device 450 may include a vibration dampener system comprising of a build platform dampener 455a and an injection dampener 455b. Based on the adjusted geometric data and adjusted other data, the AM device controller 452 may control the operation of each of these dampeners to offset ambient vibrations during a build. This may be done either by modifying dampener rigidity and/or generating a cancelling contrapositive vibration.

The AM device 450 may be connected to external systems. More particularly, the AM device controller 452 may provide the adjusted geometric data and adjusted other data to either a mobile unit system 456a and/or an additional computing system 456b. This may provide a real time feed of the adjustments made by the build quality compensation unit to external systems. This may also facilitate operation, monitoring, and/or troubleshooting of the AM device 450.

FIG. 5A is measured data 500a from a sensor suite in a build quality compensation system, according to an example embodiment. As previously mentioned, a sensor suite may be a collection of sensors that are configured to sense ambient conditions in a mobile unit. The measured data 500a emanates from an ambient temperature sensor and an ambient humidity sensor. Notably, the ruleset parameters for these two measurements are illustrated as a maximum sensed value $MAX_{(sense)}$ and a minimum sensed value $MIN_{(sense)}$. Measured data 500a highlights the points in which the ambient temperature has dropped below the acceptable minimum sensed value $MIN_{(sense)}$. As previously discussed in FIG. 2, this triggers the selection of ruleset adjustment instructions that are forwarded to a machine instruction buffer.

Figure 5B:
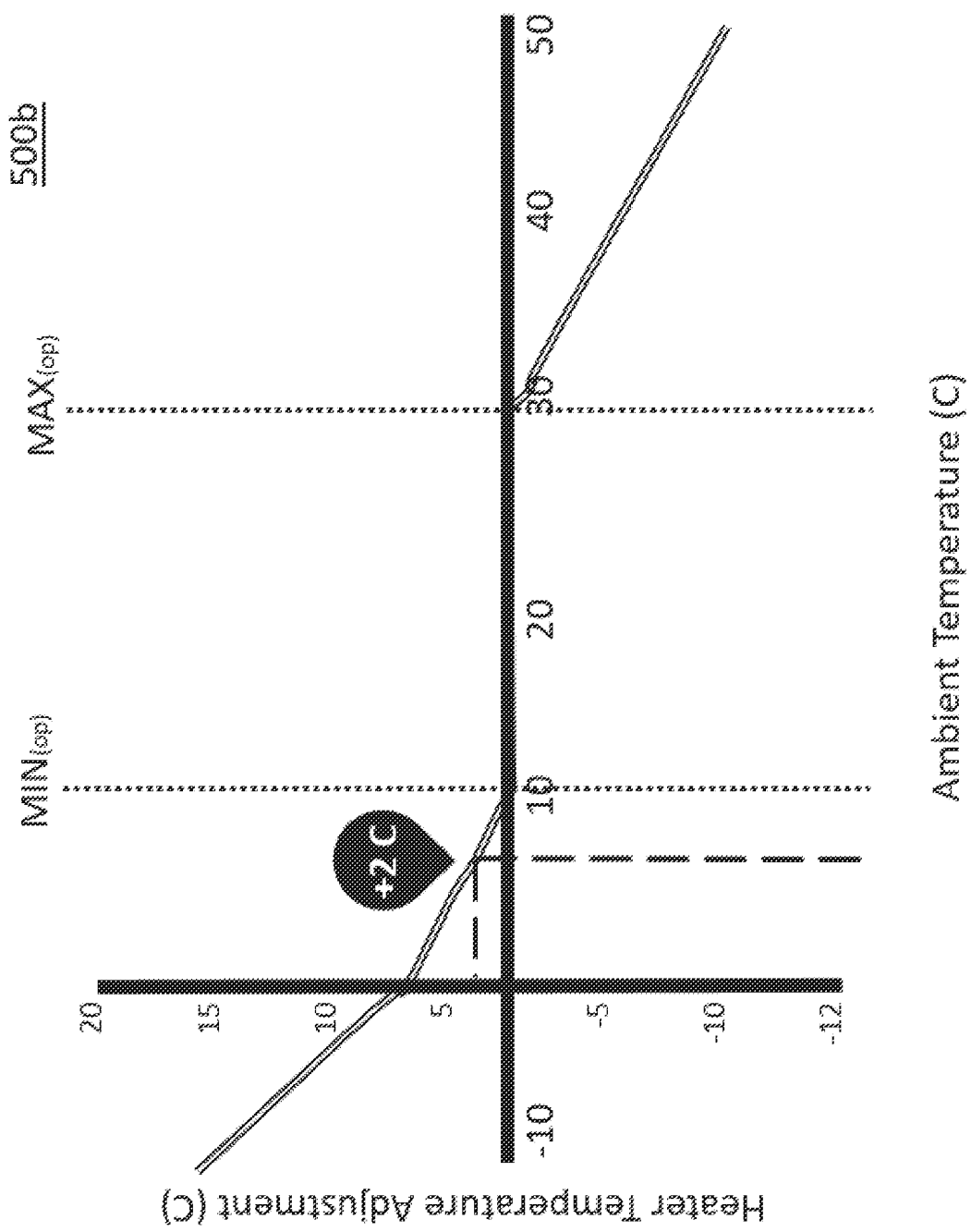
FIG. 5B is a ruleset adjustment instruction for temperature in a build quality compensation system, according to an example embodiment.

FIG. 5B is a ruleset adjustment instruction for temperature 500b in a build quality compensation system, according to an example embodiment. In this chart, the y-axis indicates heater temperature adjustment in Celsius. The heater temperature adjustments are directed to a heating element in an injection system of an AM device. The x-axis indicates the ambient temperature, also in Celsius. The ruleset defines a maximum operational value $MAX_{(op)}$ and a minimum operational value $MIN_{(op)}$. The heating element adjustments are made if the ambient temperature measured by the sensor suite is outside the operational values. In the case of the ruleset adjustment instruction for temperature 500b, if the ambient temperature is approximately 7° C., below the minimum operational value $MIN_{(op)}$ of 10° C., then the ruleset adjustment is for an additional 2° C.

Figure 5C:
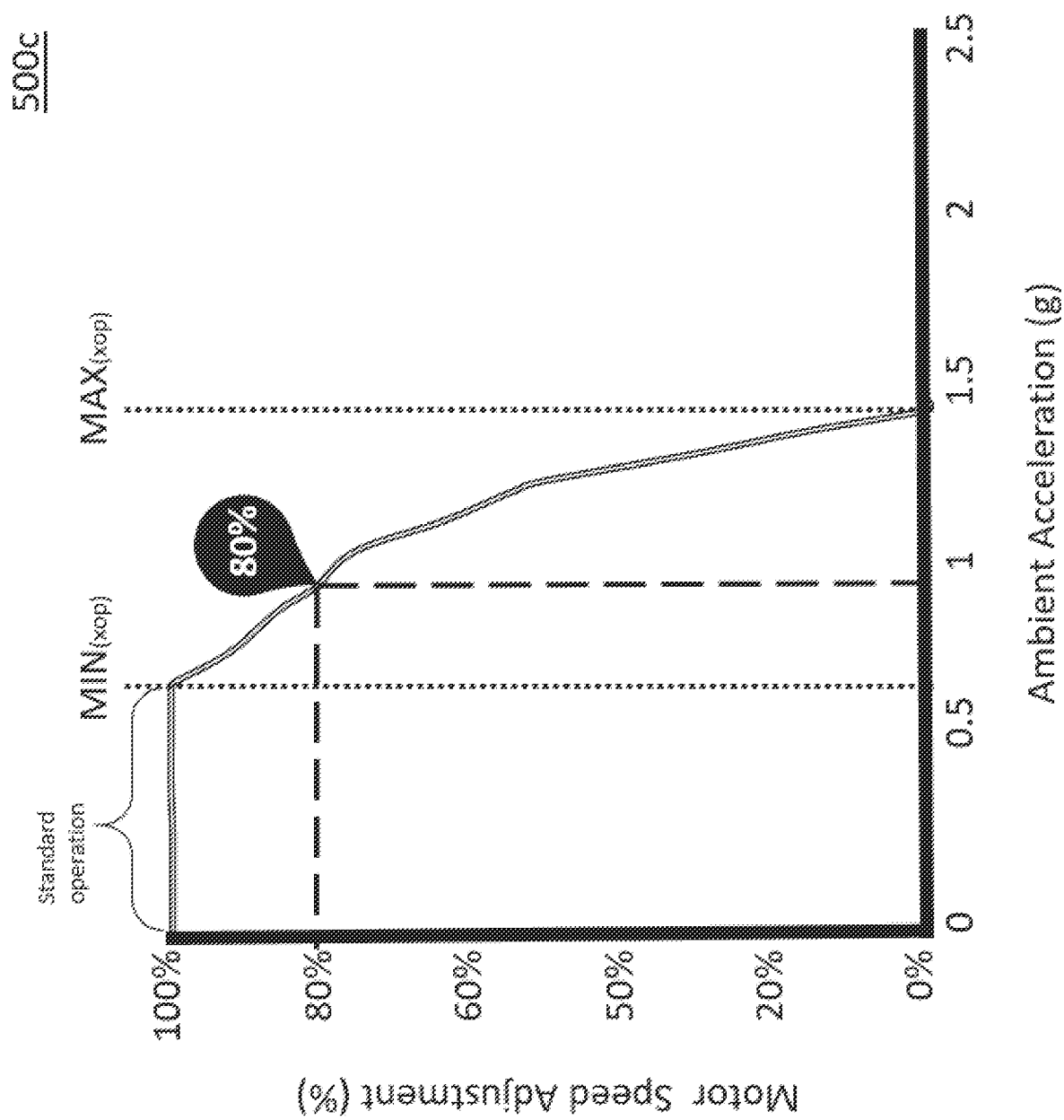
FIG. 5C is a ruleset adjustment instruction for motor speed in a build quality compensation system, according to an example embodiment.

FIG. 5C is a ruleset adjustment instruction for motor speed 500c in a build quality compensation system, according to an example embodiment. In this chart, the y-axis indicates motor speed adjustment (in percentage) for any of the motors in an AM device (e.g., x-axis motor, y-axis motor, z-axis motor, other motor). The x-axis indicates the ambient acceleration (g). The ruleset defines a maximum operational value $MAX_{(xop)}$ and a minimum operational value $MIN_{(xop)}$. Unlike the previous figure, however, in this example the speed adjustments are made within the operational values of the motors. The goal of ruleset adjustment instruction 500c is to define the extent to which the motors can operate beyond the parameters defined by a manufacturer. In the case of the ruleset adjustment instruction for temperature 500c, if the ambient acceleration is approximately 0.9 g, within the operational range, then the ruleset adjustment is for the indicated motor to operate at 80% capacity. Notably, in this example, if the ambient acceleration is below the minimum operational value $MIN_{(xop)}$, then the ruleset adjustment is for the motor to operate at 100% capacity. This makes sense since a value between 0 g ambient acceleration and the minimum operational value $MIN_{(xop)}$ would align with the parameters defined by a manufacturer. On the other hand, if the ambient acceleration is above the maximum operational value $MAX_{(xop)}$, then the indicated motor operates at 0% capacity (in other words, it is "off"). This indicates that there is no amount of adjustment that can be made on the motor to allow operation of the AM device.

Figure 6:
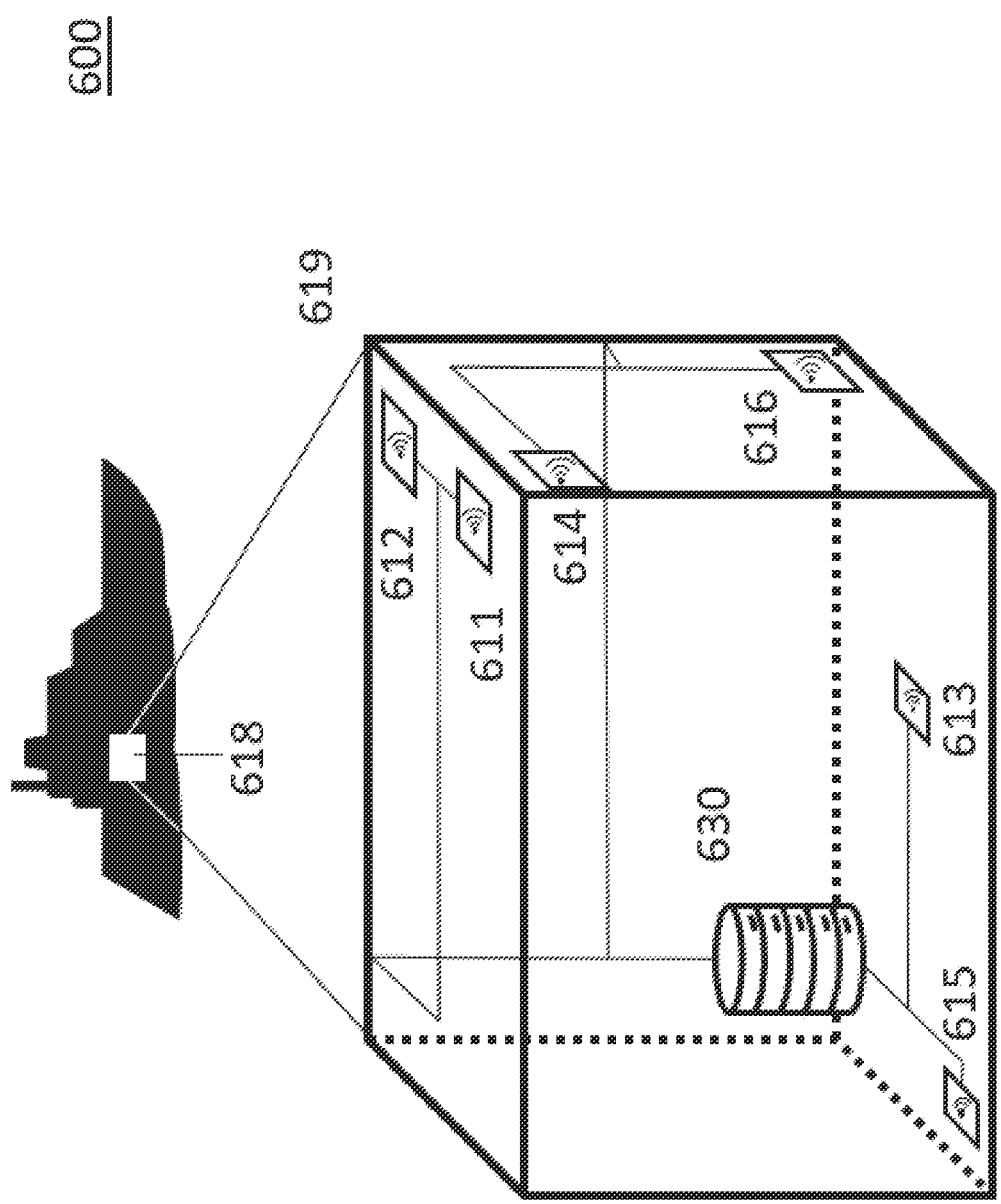
FIG. 6 is a sensing suite configuration of a build quality compensation system within a vessel, according to an example embodiment.

FIG. 6 is a sensing suite configuration 600 of a build quality compensation system 618 within a vessel, according to an example embodiment. In this example embodiments, the sensor suite elements are distributed throughout a predefined area 619. The ceiling of the predefined area 619 includes the ambient temperature sensor 611 and the ambient humidity sensor 612. The wall of the predefined area 619 includes the ambient orientation sensor 614 and the ambient shock sensor 616. The floor of the predefined area 619 includes the ambient acceleration sensor and the ambient vibration sensor. The configuration 600 is exemplary and sensors can be distributed in a different fashion according to vessel requirements, space limitations, operational goals, and/or sensitivity to certain measured data. For example, all sensors can be on the ceiling, wall, or floor, as well as any combination thereof like configuration 600.

In alternative example embodiments, the sensor suite can be distributed throughout the vessel. The sensor suit may also obtain particular measurements from either external systems or the vessel system itself. Of example, in lieu ambient temperature sensor 611, the sensor suite may be connected to the vessel HVAC system to obtain temperature measurements.

Figure 7:
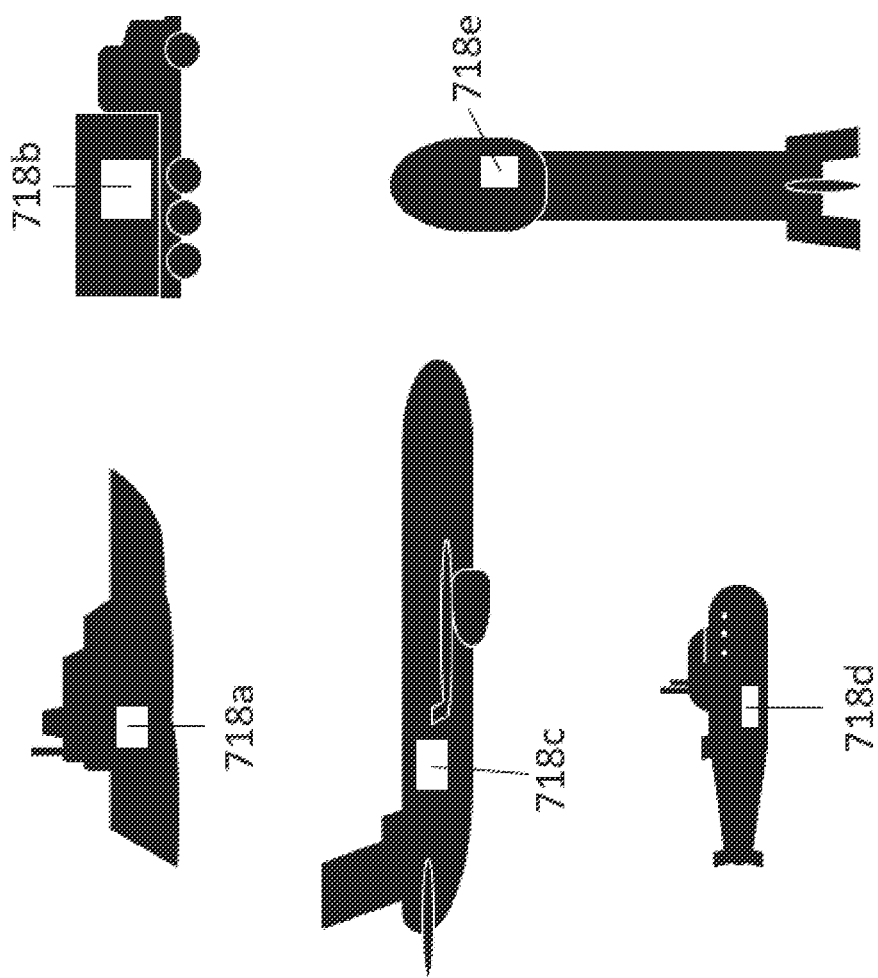
FIG. 7 is implementation of the build quality compensation system in a mobile unit, according to various example embodiments.

FIG. 7 is implementation 700 of the build quality compensation system in a mobile unit, according to various example embodiments. In said example embodiments, the sensor suite configurations will have to be calibrated according to the nature of the mobile unit. The example embodiments so far discussed contemplate a build quality compensation system configured within a vessel 718*a*. Build quality compensation system 718*a* is configured to consider ocean turbulence, humidity and temperature in open water, and other factors unique to the ocean setting. In another example embodiment, a build quality compensation system is configured within a vehicle 718*b*. Build quality compensation system 718*b* is configured to consider terrain (e.g., dessert, jungle, tundra, mountain, and/or snow). In another example embodiment, a build quality compensation system is configured within an aircraft 718*c*. Build quality compensation system 718*b* is configured to consider wind turbulence and/or atmospheric pressure altitude.

Additional example embodiments may contemplate more extreme settings. In one example embodiment, a build quality compensation system is configured within a submersible 718*d*. Build quality compensation system 718*b* is configured to consider extreme depths, pressure, and deep sea turbulences. In another example embodiment, a build quality compensation system is configured within a spacecraft 718*e* (e.g., a space ship, satellite, space station). Build quality compensation system 718*b* is configured to consider extreme altitudes and/or microgravity.

Figure 8:
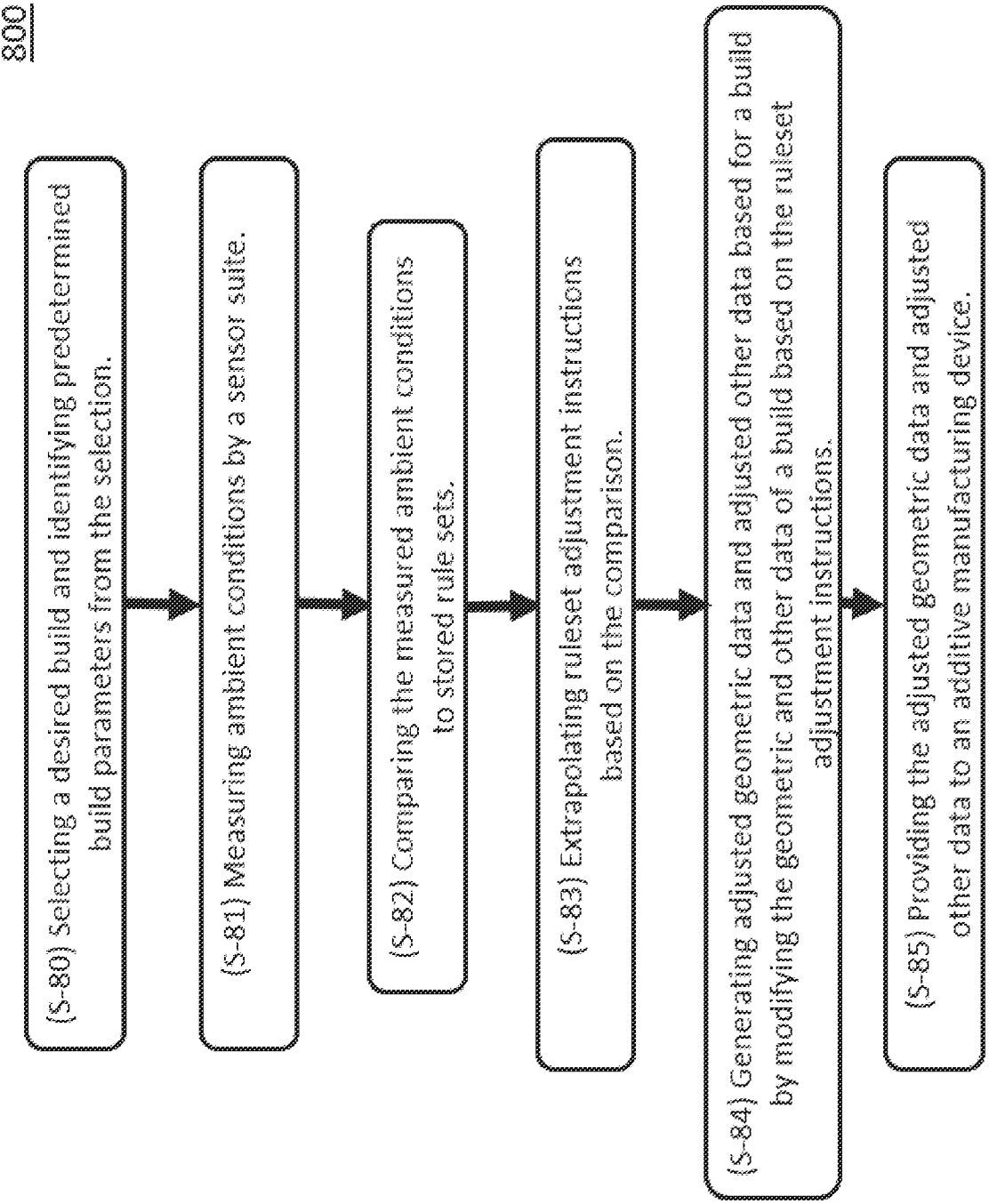
FIG. 8 is a build quality compensation method according to an example embodiment.

FIG. 8 is a build quality compensation method 800 according to an example embodiment. The method may begin with an initial step (S-80) of selecting a desired build and identifying predetermined build parameters from the selection. This may be followed by (S-81) a sensor suite measuring ambient conditions. Next is (S-82) comparing the measured ambient conditions to stored rulesets. This is followed by extrapolating ruleset adjustment instructions based on the comparison. Next is (S-84) generating adjusted geometric data and adjusted other data based for a build by modifying the geometric and other data of a build based on the ruleset adjustment instructions. Finally, (S-85) the adjusted geometric data and adjusted other data is provided to an AM device.

Example embodiments allows preplanned machine instructions to be diverted from. Through the use of studied and tested machine and material specific rulesets, the Build quality compensation system is able to maintain a level of homeostasis in an environment that may be unknown at the time of AM operation or pathing. This is a unique and novel concept.

The example embodiments being thus described, it will be obvious that the same may be varied in many ways. Such variations are not to be regarded as a departure from the disclosed subject matter, and all such modifications are intended to be included within the scope of the disclosed subject matter.

What is claimed is:

1. An additive manufacturing compensation system comprising:
   a sensor suite configured to measure ambient conditions through the use of at least one sensing element;
   a controller unit configured to receive the measured ambient conditions and generate adjusted additive manufacturing data corresponding to a build in response to the measured ambient conditions, the controller comprising a ruleset comparison unit, a machine instruction buffer, and machine instructions for the build; and
   an additive manufacturing device configured to receive the adjusted additive manufacturing data and manufacturing the build based on the adjusted additive manufacturing data,
   wherein the ambient conditions correspond to ambient conditions of a mobile unit.

2. The additive manufacturing compensation system of claim 1, wherein the at least one sensing element include at least one of an ambient temperature sensor, an ambient humidity sensor, an acceleration sensor, an orientation sensor, an ambient vibration sensor, and an ambient shock sensor.

3. The additive manufacturing compensation system of claim 1, wherein the mobile unit is at least one of a vessel, vehicle, aircraft, submersible, and spacecraft.

4. The additive manufacturing compensation system of claim 1, wherein
   the machine instructions have standard additive manufacturing data corresponding to a build, the standard manufacturing data comprising standard geometric data and standard other data;
   the ruleset comparison unit compares the measured ambient conditions to parameters of a ruleset and selects corresponding ruleset adjustment instructions for modifying the standard additive manufacturing data; and
   the machine instruction buffer receives the standard additive manufacturing data and the ruleset adjustment instructions, wherein the machine instruction buffer responsively generates the adjusted additive manufacturing data, the adjusted additive manufacturing data comprising adjusted geometric data and adjusted other data.

5. The additive manufacturing compensation system of claim 4, wherein the standard other data and the adjusted other data are in a format comprising at least one of machine data, material data, and metadata.

6. The additive manufacturing compensation system of claim 4, wherein the adjusted additive manufacturing data is generated in a tool pathing unit of the machine instruction buffer.

7. The additive manufacturing compensation system of claim 1, wherein the additive manufacturing device comprises a controller configured to receive the adjusted additive manufacturing data and adjust elements of the additive manufacturing device.

8. The additive manufacturing compensation system of claim 7, wherein the controller controls motors of the additive manufacturing device in response to the adjusted additive manufacturing data to adjust movement along at least one axis.

9. The additive manufacturing compensation system of claim 7, wherein the controller controls an injection system of the additive manufacturing device in response to the adjusted additive manufacturing data, the injection system comprising at least a supply, a heating element, and a nozzle.

10. The additive manufacturing compensation system of claim 7, wherein the controller alters a temperature of the heating element in response to the adjusted additive manufacturing data, wherein the controller alters the rate of the supply in response to the adjusted additive manufacturing data, and wherein the controller adjusts delivery speed of material from the nozzle in response to the adjusted additive manufacturing data.

11. The additive manufacturing compensation system of claim 7, wherein the controller controls a dampener system in response to the adjusted additive manufacturing data.

12. The additive manufacturing compensation system of claim 7, wherein the controller is further configured to communicate with at least one external system in response to receiving the adjusted additive manufacturing data.

13. The additive manufacturing compensation system of claim 12, wherein the at least one external system is a mobile unit system configured to at least one of operate, monitor, and troubleshoot the additive manufacturing device, wherein the mobile unit system is configured to provide additional or independent measured ambient conditions to the sensor suite.

14. The additive manufacturing compensation system of claim 12, wherein the at least one external system is a computing system, the computing system comprising at least one of a network, cloud, and a different mobile unit system.

15. An additive manufacturing compensation system comprising:
a sensor suite configured to measure ambient conditions through the use of at least one sensing element;
a controller unit configured to receive the measured ambient conditions and generate adjusted additive manufacturing data corresponding to a build in response to the measured ambient conditions, the controller comprising a ruleset comparison unit, a machine instruction buffer, and machine instructions for the build; and
an additive manufacturing device configured to receive the adjusted additive manufacturing data and manufacturing the build based on the adjusted additive manufacturing data,
wherein the additive manufacturing device comprises a controller configured to receive the adjusted additive manufacturing data and adjust elements of the additive manufacturing device,
wherein the controller is further configured to communicate with at least one external system in response to receiving the adjusted additive manufacturing data.

16. The additive manufacturing compensation system of claim 15, wherein the at least one sensing element includes at least one of an ambient temperature sensor, an ambient humidity sensor, an acceleration sensor, an orientation sensor, an ambient vibration sensor, and an ambient shock sensor.

17. The additive manufacturing compensation system of claim 15, wherein the ambient conditions correspond to ambient conditions of a mobile unit.

18. The additive manufacturing compensation system of claim 15, wherein
the machine instructions have standard additive manufacturing data corresponding to a build, the standard manufacturing data comprising standard geometric data and standard other data;
the ruleset comparison unit compares the measured ambient conditions to parameters of a ruleset and selects corresponding ruleset adjustment instructions for modifying the standard additive manufacturing data; and
the machine instruction buffer receives the standard additive manufacturing data and the ruleset adjustment instructions, wherein the machine instruction buffer responsively generates the adjusted additive manufacturing data, the adjusted additive manufacturing data comprising adjusted geometric data and adjusted other data.

19. The additive manufacturing compensation system of claim 15, wherein the additive manufacturing device comprises a controller configured to receive the adjusted additive manufacturing data and adjust elements of the additive manufacturing device.

* * * * *